United States Patent [19]

Loppnow

[11] Patent Number: 4,809,563

[45] Date of Patent: Mar. 7, 1989

[54] BICYCLE PEDAL

[76] Inventor: Duane Loppnow, 772 Casiano Dr., Santa Barbara, Calif. 93105

[21] Appl. No.: 110,788

[22] Filed: Oct. 21, 1987

[51] Int. Cl.⁴ .................................................. G05G 1/14
[52] U.S. Cl. ..................................... 74/534.6; 74/594.4
[58] Field of Search ............... 74/594.4, 594.6, 594.5; 36/131; D12/125

[56] References Cited

U.S. PATENT DOCUMENTS

| | | | |
|---|---|---|---|
| 388,048 | 9/1888 | Johnson et al. | 74/594.4 |
| 493,696 | 3/1893 | Ferguson | 74/594.6 |
| 533,180 | 1/1895 | Perkins | 74/594.4 |
| 645,947 | 3/1900 | Faulkner | 74/594.4 |
| 3,857,585 | 12/1974 | Foster | 74/594.4 |
| 4,244,239 | 1/1981 | Campagnolo | 74/594.4 |
| 4,402,502 | 9/1983 | Peters | 74/594.4 |
| 4,596,163 | 6/1986 | Bon | 74/594.4 |

FOREIGN PATENT DOCUMENTS

| | | | |
|---|---|---|---|
| 77431 | 2/1894 | Fed. Rep. of Germany | 74/594.4 |
| 941771 | 1/1949 | France | 74/594.4 |
| 278118 | 9/1930 | Italy | 74/594.4 |
| 102890 | 1/1924 | Switzerland | 74/594.6 |
| 25154 | of 1910 | United Kingdom | 74/594.6 |
| 657886 | 9/1951 | United Kingdom | 74/594.4 |

Primary Examiner—Richard E. Moore
Assistant Examiner—Vinh Luong
Attorney, Agent, or Firm—Milton S. Gerstein

[57] ABSTRACT

A pedal for a bicycle is provided with a foot restraint that is pivotally mounted at one end of the pedal. The foot restraint is continuously spring-biassed into its upright, foot-engaging position, and is collapsible or foldable against the force of the spring, so that, when riding in rough or hilly terrain when the pedal is inverted with the foot restraint facing toward the ground, upon the foot restraint striking the ground, it is forced to fold or collapse parallel to the pedal to obviate its hindrance to the maneuverability of the bicycle. The foot restraint is also adjustable in the horizontal and vertical directions so as to be adaptable to various sizes and shapes of shoes.

16 Claims, 3 Drawing Sheets

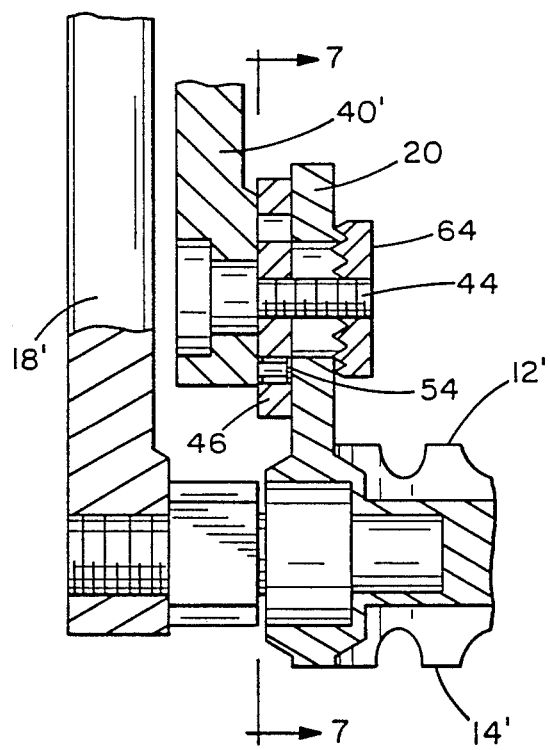
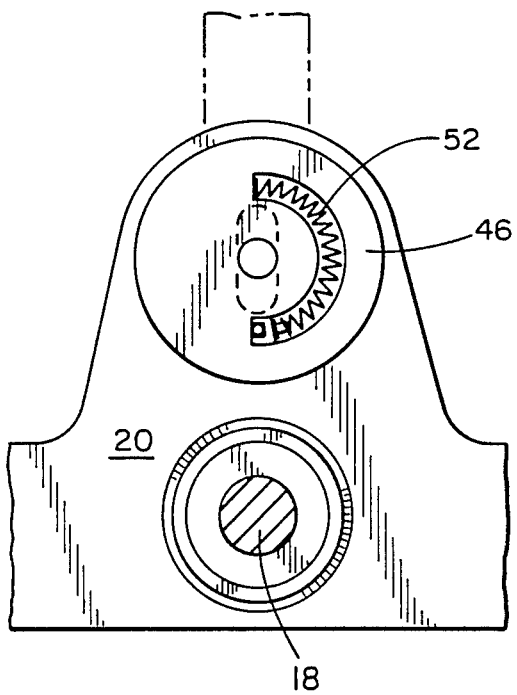
FIG.6    FIG.7
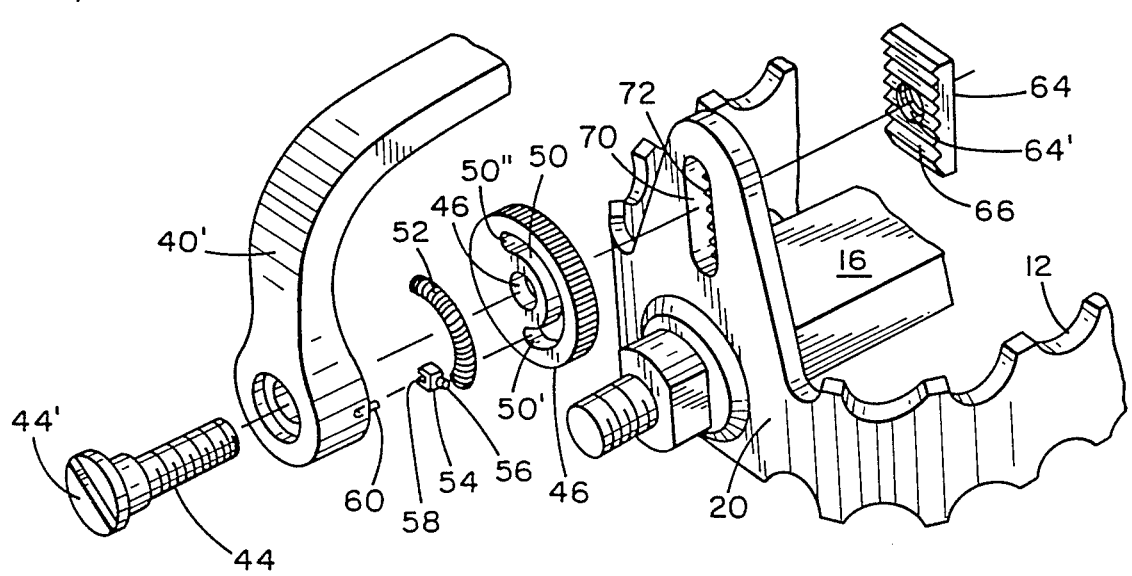
FIG.8

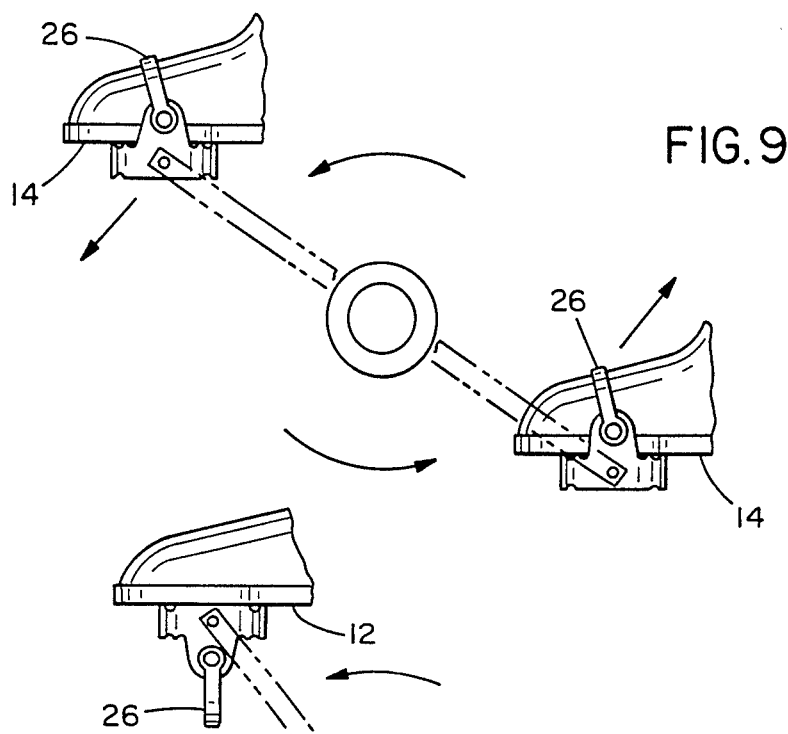
FIG. 9
FIG. 10
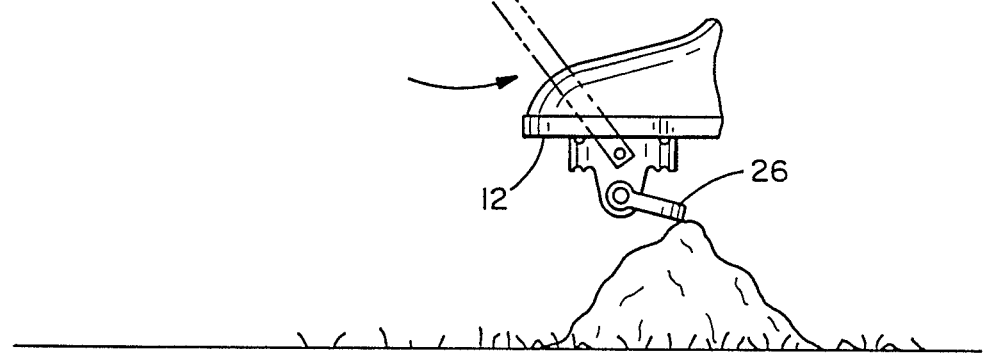
FIG. 11
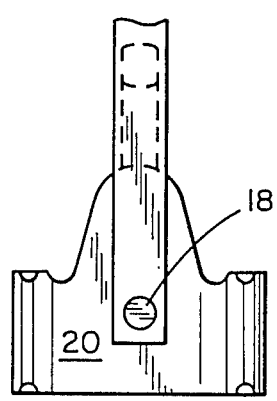
FIG. 12

BICYCLE PEDAL

BACKGROUND OF THE INVENTION

The present invention is directed to a pedal for a bicycle, such as a mountain bicycle, although the use and application thereof is relevant to all types of bicycles. Prior art bicycle pedals allow for the foot to power the bicycle upon the downward stroke thereof, thereby permitting only one foot at any given time the ability to power the movement. Prior-art pedals do exist in which toe clips are provided which allow for the insertion of the toe portion of the shoe therein, whereby the power stroke is expanded, to a certain degree, to the upward stroke of the foot, to thereby augment the normal powering motion. However, these prior-art pedals with toe clips suffer from the serious disadvantage of not allowing for an easy removal of the shoe or foot therefrom, which ofttimes is desirable, such as when encountering rough terrain where the ability to easily and quickly stabilize the bike via one foot or the other is a necessity if a fall is to be avoided. Furthermore, prior art toe clips are not easily nor readily adjustable to fit various sizes and shapes or shoe or foot, also leading to an uncomfortable positioning of the foot, as well as potentially further aggravating the problem of ease of removal of the foot or shoe from the toe clip when necessary.

SUMMARY OF THE INVENTION

It is, therefore, the primary objective of the present invention to provide a bicycle pedal having a foot restraint associated therewith, which foot restraint permits of easy and fast removal of the foot in order to allow for proper maneuvering of the bicycle in rough terrain.

It is another objective of the present invention to not only allow for easy and fast removal of the foot from its restraint, but also to ensure that the foot restraint itself does not hinder or obstruct the proper maneuvering of of the bicycle during its movement over rough terrain, such being accomplished by the provision of a folding foot restraint normally biassed into its operative state, but easily folded to an inoperative state substantially parallel to the main axis of the pedal by the relatively small force applied thereto by the contact of the foot restraint against the terrain itself.

It is yet another objective of the present invention to provide such a foldable foot restraint for a bicycle that is adjustable in the for-and-aft direction as well as in the vertical directions, so as to comfortably accomodate various sizes and shapes of shoes and feet.

Toward these and other ends, the bicycle pedal of the present invention has a main pedal portion pivotally connected to a crank arm of a mountain bicycle, or the like, upon which main pedal portion may be supported a foot of the bicycle rider. Coupled and operatively associated with the main pedal portion is a foldable, spring-biassed foot restraint under which the foot of the rider is placed, so that the power stroke is extended to the upward movement of the foot, in addition to the downward movement thereof. The foot restraint is normally biassed into an operative, foot-restraining position where the main, longitudinal portion of the foot restraint extending parallel to the length of the pedal is spaced above the main pedal portion, to thereby allow for the foot to be sandwiched between the main pedal portion and the longitudinal portion of the foot restraint. During pedaling on rough terrain or when it is desired to remove the foot from the foot restraint, the pivotal movement thereof allows for such to occur readily and easily. Furthermore, when pedaling in rough or hilly terrain, when it is necessary to have at least one foot free for balancing and maneuvering, the pedal of the invention ensures that a quick and safe changeover from using the foot restraint in its normal manner to nonuse thereof takes place, such being accomplished by first removing the foot from between the restraint and main pedal portion, and rotating the main pedal portion 180 degrees to invert the pedal such that the foot restraint faces downwardly toward the ground. The pivotal or foldable nature of the foot restraint allows for the contact thereof against the ground without any adverse effects to the rider's ability to maneuver, since only a slight force exerted by the reaction with the ground contact causes the foot restraint to fold, or collapse, thus preventing it from becoming an obstacle itself to the rider.

In order to allow for adjustability of the foot restraint in order to accomodate various sizes and shapes of shoes and feet, the foot restraint is coupled to the main pedal portion via a bolt the threaded shank of which passes through a disc-shaped adjusting plate rotatably mounted about the shank of the bolt. The adjusting plate is provided with an arcuate opening in which is positioned a coil spring. A lower, interior surface portion of the foot restraint is provided with a projecting pin which is received in a detent block positioned and operatively coupled to the lower end of the coil spring. The end of the threaded shank passes through a vertical slot formed in the main pedal portion itself and is retained by a serrated block, or rectilinear-shaped nut. By simply loosening the nut, and rotating the adjusting plate in one direction or the other, the coil spring will cause the positioning of the foot restraint in a desired fore-and-aft position, since the foot restraint is freely rotatable with respect to the bolt, the projecting pin itself determining the limit of rotatable movement in cooperation with the detent block's abutment against the respective end of the arcuate channel.

Vertical adjustment is achieved by moving the threaded shank to a desired position within the vertical channel of the main pedal portion.

BRIEF DESCRIPTION OF THE DRAWING

The invention will be more readily understood with reference to the accompanying drawing, wherein:

FIG. 6 is a cross-sectional view taken along line 6—6 of FIG. 4;

FIG. 7 is a cross-sectional view taken along line 7—7 of FIG. 6;

FIG. 8 is an exploded assembly showing the arrangement and connection of parts of the pedal of the invention;

FIG. 9 is a diagrammatical view showing the normal use of two pedals of the invention when provided on a bicycle;

FIG. 10 is a diagrammatical view similar to FIG. 9 but with the pedals of the invention turned upside-down for pedaling in rough terrain, with the foot restraint of one pedal of the invention folded back by the force exerted by the terrain as the restraint strikes thereagainst, so that the foot restraint of the invention does not hinder or obstruct maneuvering;

FIG. 11 is a side elevation view of a modification of the pedal of the invention; and FIG. 12 is a end view of the modification of FIG. 11.

DETAILED DESCRIPTION OF THE INVENTION

Figure 1:
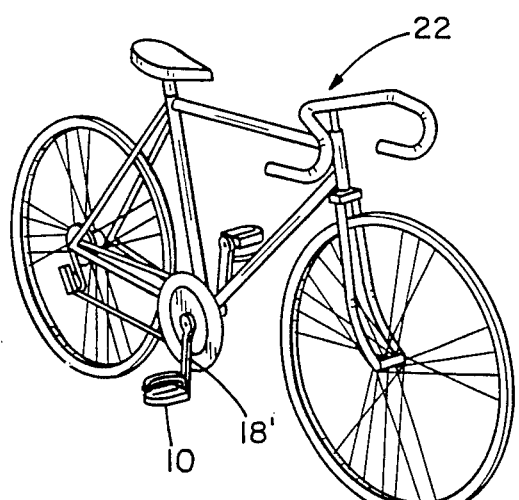
FIG. 1 is an isomeric view showing a bicycle incorporating therein the pedal of the invention.
Figure 2:
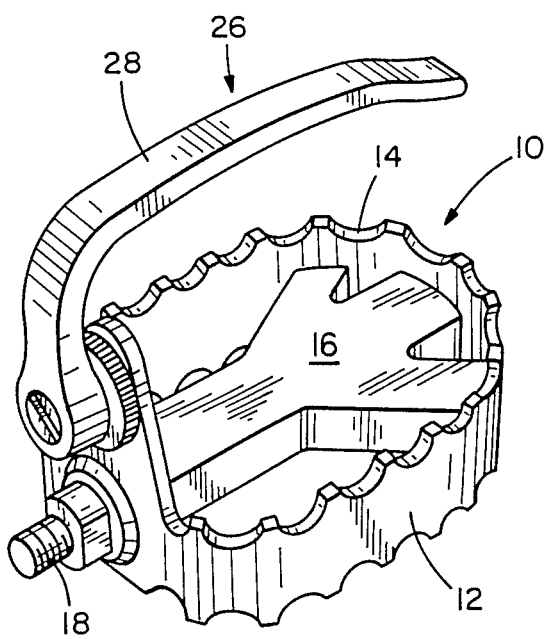
FIG. 2 is an isometric view showing the bicycle pedal of FIG. 1 with the foldable foot restraint thereof.
Figure 3:
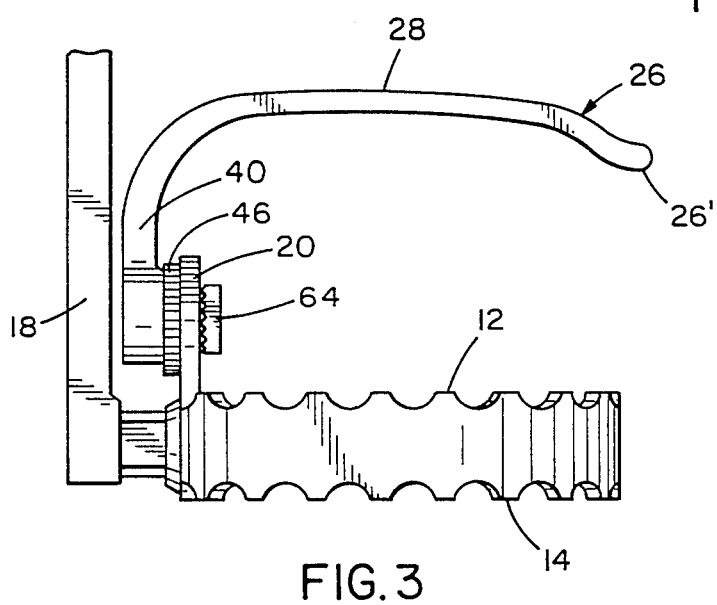
FIG. 3 is a side elevation view of the pedal of FIG. 2.
Figure 4:
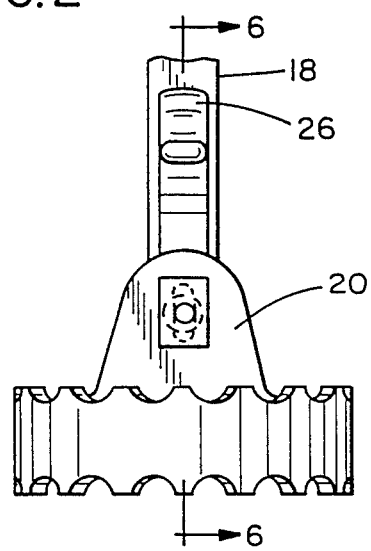
FIG. 4 is an end view thereof.
Figure 5:
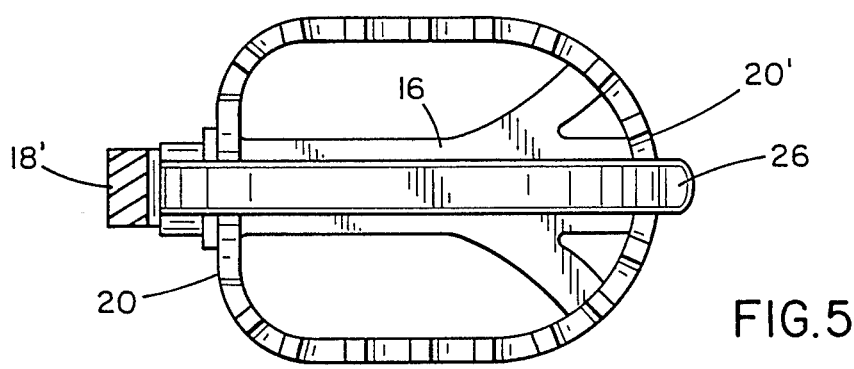
FIG. 5 is a top view thereof.

Referring now to the drawings in greater detail, the bicycle pedal of the invention is indicated generally by reference numeral 10. As shown in FIG. 2, the bicycle pedal 10 has a main pedal portion 12 of horseshoe shape formed by circumferential walls and defining a serrated upper edge surface 14 against which a bicycle rider rests his foot for pushing on the pedal to drive the bicycle. The main pedal portion has an integrally-connected conventional spline 16 positioned within the hollow interior defined by the circumferential walls of the main pedal portion for structural integrity. A threaded shaft 18 projecting outwardly from the end wall surface 20 through opening 19 thereof secures the main pedal portion to a lever crank 18' of a bicycle 22 shown in FIG. 1. The threaded shaft 18 has an extension projecting into the main pedal portion, which is provided with inner and outer end bearings, for rotatably mounting the spline 16, and, therefore, the entire pedal for rotation thereabout, in the conventional manner. The main pedal portion is also provided with a lower serrated edge surface 14' to increase friction and against which rests a foot when the pedal 10 is inverted.

The pedal 10 is provided with a foot restraint 26 which is used to hold the foot in place and to allow for a continuation of the power stroke of the foot and leg to the upward movement thereof, so that the power phase of the foot and leg of the bicycle rider is extended to a full cycle, rather than the half-cycle, downward-movement power stroke only. The foot restraint 26 includes a generally elongated, slightly convex section 28 extending, in the foot-engaging state of the restraint, parallel to and above the longitudinal axis of the main pedal portion, which axis is defined between the end walls 20, 20' of the main pedal portion and passing through the spline 16. The section 28 terminates in an extra-length portion or extension 26' that allows the rider to hook the end thereof with the side of the foot for orienting the pedal in its upright, foot-restraining state, while also assisting in the insertion of the foot beneath the foot restraint's elongated section 28 by allowing greater control of the pedal while inserting the foot sideways into the region between the upper edge surface 14 and the elongated section 28. The extension 26' also cants slightly downwardly from the section 28 toward the upper edge surface or rim 14, such canting being minimal so that it will not interfere with the actual insertion of the foot in the restraint.

The foot restraint 26 is pivotally mounted to the to the main pedal portion at the end surface 20 thereof, with the foot restraint being continuously biassed into its foot-engaging, operative state shown in FIGS. 2-5. The reason for the foldability or collapsibility of the foot restraint is to ensure that the foot restraint itself does not pose any hindrance to the normal maneuvering of the bicycle when the pedal 10 is inverted, with the foot engaging the edge surface or rim 14' rather than the upper edge surface or rim 14, which would occur when traversing rough or hilly terrain, such as often occurs in the sport of mountain biking with a mountain bicycle.

The structure for pivotally mounting the foot restraint 26 is best seen in FIG. 8. The lower end portion of the relatively-vertically oriented leg portion 40' of the foot restraint 26 is provided with an opening 42, through which opening passes a threaded pivot shaft or bolt 44 having grooved head 44'. A disc-shaped adjusting plate 46 is provided and has a central opening 46' also through which passes the shank of the threaded shaft 44, the foot restraint 26 and disc-shaped adjusting plate 46 being rotatable about the shaft 44 when free to do so by loosening the bolt via the head portion 44'. The disc-shaped adjusting plate 46 is also provided with an arcuate slot or groove 50, that is substantially semicircular, which arcuate slot surrounds approximately half of the central opening 46', although such not being critical to the invention. The slot 50 is a coil spring-retaining slot for the spring 52 which is nestled snugly therein, each end of the spring being associated with a respective end of the channel or slot 50. A detent block 54 is provided and has a projecting connecting pin 56 for insertion into the lower open end of the spring 52. The detent block itself is positioned in the slot 50, at the lower end 50' thereof and is forced against the lower end 50' by the force of the spring 52. The block 54 also has a pin-receiving opening or open face 58 disposed oppositely to the pin 56 for receiving therein another projecting pin 60 projecting from the lower, inner surface of the portion 40' of the foot restraint 26. The pin 60, when it is coupled to the block 54, causes the foot restraint proper to be biased in the clockwise direction when viewing FIG. 8, such biassing taking place by the spring 52 and via the intermediate structure of the pin 56, block 54, and pin 60. Thus, the foot restraint is continuously urged into an upright, foot-engaging position, but may be readily pivoted to its non-operative state by simply providing a counterforce to the spring, to thereby cause the counterclockwise rotation of the foot restraint and the concomitant movement of the block 54 and pin 60 along the slot 50 in a direction toward the other, upper end 50".

The parts are held together as a unit by the force provided by the tightening of a nut 64 having a threaded opening 64'. The nut is a rectilinear-shaped block element having an inner surface defining a series of parallel serrations 66 for increasing the static friction with the inner surface of the end wall 20. The tightening of the nut 64 sandwiches and retains the adjusting plate 46 in that rotated position to which it has been set. Thus, by simply rotating the adjusting plate 46 to one orientation or another, the orientation of the foot restraint in its upright, foot-engaging state may be adjusted, thereby allowing for fore-and-aft adjustment of the foot restraint to suit the particular comfort of the rider and size of his foot. By rotating the adjusting plate in the counterclockwise direction from the position shown in FIG. 8, the foot restraint will become more vertically oriented or more upright, while rotating the plate in the clockwise direction will orient the foot restraint closer to the main pedal portion, the rotation taking place since the pin 60 lies downwardly offset from the longitudinal axis of the threaded shaft 44. The rule is that the direction of rotation of the adjusting plate is that direction one wants the foot restraint to be rotated to suit his or her comfort and need.

To provide vertical adjustment to the foot restraint 26, the threaded shaft 44 extends through a vertical slot 70 formed in the end wall 20. The vertical slot may be subdivided by a pair of oppositely disposed, zig-zag shaped vertical strips 72, only one being shown in FIG. 8 for clarity, the other zig-zag strip being offset with respect to the strip shown by 90 degrees so that each apex of the strip lies opposite a crest of the other strip, the two strips defining a zig-zag path that the threaded shank 44 traverses during its vertical adjustment to various heights above the upper edge or rim 14. Thus, the foot restraint is adjustable in both the vertical direction as well as in the forward and reverse directions. It is, of course, possible to provide a simple vertical channel 70 without any other structure therein.

FIGS. 9 and 10 show the use of the pedal 10 on a bicycle. FIG. 10 shows the normal use of the pedal 10, where each foot of the rider is positioned between the upper edge 12 and foot restraint 26 of a respective pedal 10. The foot restraint allows for the power stroke to be one continuous 360 degree cycle of rotation of the foot and leg. When encountering rough or hilly terrain, when it is necessary to allow for at least one foot to be free for maneuverability purposes, the pedal 10 is inverted, as shown in FIG. 10, with each foot resting on the lower edge 14', which now constitutes the upper edge. As can be seen in FIG. 10, when the foot restraint 26 itself strikes against the rough or hilly terrain, it is forced to fold or collapse, in the manner above-described, so as to clear such terrain and prevent its hindrance or obstruction to the maneuverability of the bicycle.

FIGS. 11 and 12 show a slight modification of the pedal. The pedal 10' is rotatably mounted about the bolt 18' in an eccentric manner, with the axis of rotation, defined by the longitudinal axis of the bolt 18', lying vertically and upwardly offset from the central, horizontal, bisecting plane of the main pedal portion, so that the center of gravity of the pedal system 10' tends to normally orient the pedal in its normal, upright state where the foot restraint lies above the main pedal portion.

The pedal 10 is preferably made of lightweight, high-impact abrasive-resistant materials, such as chromium-molybdenum alloy. All moving parts are sealed as well as possible from dust, dirt, mud and water, and other harmful elements, the pedal of the invention being easily disassembled for periodic maintenance. It is also possible to provide a foot restraint and associated adjusting plate that will allow for clockwise of pivotal adjustment of the foot restraint for counter-clockwise adjustment of the adjusting plate. The width of the block nut 64 is preferably such that it is less than the width of the slot or channel 70 so that it fits snugly recessed within the inner surface of the end wall 20. The serrations 66 also preferably abut against the inner surfaces of the zig-zag shaped walls 72 to enhance frictional contact.

While a specific embodiment of the invention has been shown and described, it is to be understood that numerous changes and modifications thereof may be made without departing from the scope and spirit of the invention as set forth and defined in the appended claims.

What is claimed is:

1. A pedal for a bicycle, comprising:
    a main pedal portion upon which a foot of a bicycle rider may rest for powering a bicycle, said main pedal portion comprising a first end wall and a second end wall spaced from said first end wall, a longitudinal length of said main pedal portion being defined from said first end wall to said second end wall;
    a foot restraint pivotally connected to one of said first and second end walls, said foot restraint comprising a first leg portion pivotally connected to said one end wall, and a second leg portion extending approximately parallel to said longitudinal direction of said main pedal portion, and means for pivotally mounting said first leg portion to said one end wall; and
    biasing means for urging said foot restraint into a foot-engaging operative position where said second leg portion lies above said main pedal portion.

2. The pedal according to claim 1, wherein said one wall is said first end wall, said first end wall having a lower opening for receiving therein a pivot shaft for rotatably mounting said main pedal portion, and an upper opening for receiving therein said means for pivotally mounting said first leg portion of said foot restraint.

3. The pedal according to claim 2, wherein said upper opening is a vertically-oriented channel, said first leg portion having a lower opening, and said means for pivotally mounting comprising a pivot shaft passing through said lower opening of said first leg portion and through said channel, said channel having a length taken in the vertical direction such that said pivot shaft may be positioned at different locations along said channel to thereby allow for vertical adjustment of said foot restraint so that said second leg portion thereof may be positioned at various distances away from the upper rim portion of said main pedal portion to accomodate various sizes of feet.

4. The pedal according to claim 3, wherein said means for pivotally mounting further comprises a nut having a surface face thereof comprising a plurality of serrations for increasing static friction, said nut receiving therethrough a threaded end of said pivot shaft to thereby sandwich said first leg portion between the head of said pivot shaft and the outer surface face of said first end wall.

5. The pedal according to claim 2, wherein said biasing means comprises a plate having a central opening and an arcuate slot formed therein and having a first end thereof and a second end thereof, and a spring having a first end and a second end positioned in said arcuate slot; said means for pivotally mounting comprising a shaft, said shaft passing through said central opening of said plate; said biasing means further comprising means for operatively interconnecting said spring and said first leg portion of said foot restraint, whereby said spring pivotally urges said first leg portion into an upright, foot-engaging operative state.

6. The pedal according to claim 5, wherein said means for operatively interconnecting comprises a detent means comprising a first surface face and a second surface face and having a first projecting pin projecting from said first surface face thereof for insertion into one said end of said spring, and an opening formed in said second surface face thereof; said first leg portion comprising a second projecting pin for insertion into said opening of said second surface face of said detent means.

7. The pedal according to claim 5, wherein said upper opening is a vertically-oriented channel through which passes said means for pivotally mounting, whereby said foot restraint is vertically adjustable.

8. The pedal according to claim 1, in combination with a bicycle, said bicycle having a lever crank by which it is powered, said main pedal portion being pivotally connected to a lower portion of said lever crank.

9. The pedal according to claim 7, wherein said channel of said first end wall is of a zig-zag shape.

10. The pedal according to claim 5, wherein said plate is an adjusting plate and is rotatably mounted with respect to said shaft, said shaft having a threaded end and a head; said means for pivotally mounting also comprising a nut for said threaded end of said shaft, whereby said nut and said head of said shaft sandwich therebetween said first leg portion and said adjusting plate to retain said adjusting plate in the desired angular position representative of the desired fore-and-aft adjustment of said second leg portion of said foot restraint, said adjusting plate being rotatable upon the loosening of said nut.

11. The pedal according to claim 5, wherein said arcuate slot is semicircular in shape having a radius of curvature having a center defined at the center of said central opening of said plate, said arcuate opening enveloping half of said central opening.

12. The pedal according to claim 5, wherein said upright, foot-engaging position of said second leg portion is defined by said means for operatively interconnecting abutting against said first end of said arcuate slot, said foot restraint being easily pivoted out of said upright position by a force provided to counteract said spring.

13. The pedal according to claim 2, wherein said main pedal portion defines an upper rim having an uppermost surface and a lower rim, said first end wall having an upper extension rising above a plane containing therein the uppermost surface of said upper rim, said upper opening of said first end wall being formed in said upper extension.

14. The pedal according to claim 6, wherein said second projecting pin projects inwardly from said first leg portion such that said second projecting pin is spaced from said lower opening of said first leg portion so as to cause the pivotal rotation of said foot restraint toward its foot-engaging operative state.

15. The pedal according to claim 1, wherein said second leg portion comprises an extension portion whereby said second leg portion extends substantially the entire length of said main pedal portion and said extension portion projects slightly beyond the other said end wall to provide a means for the hooking of said foot restraint means by the foot of a rider for better control thereby.

16. The pedal according to claim 2, wherein said main pedal portion comprises an upper rim and a lower rim, said foot restraint projecting above said upper rim in the normal, uninverted state of said main pedal portion, said lower opening of said first end wall being upwardly offset from a horizontal plane containing therein the center of mass of said main pedal portion, whereby said main pedal portion tends to assume its normal, upright state where said foot restraint and said upper rim face skyward during power strokes.

* * * * *